Sept. 21, 1965 F. K. KNOHL 3,207,023
SCREW FASTENER
Original Filed Dec. 1, 1961
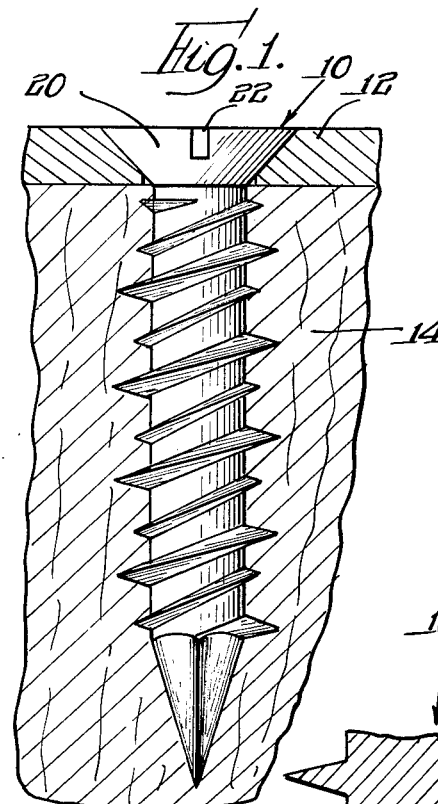
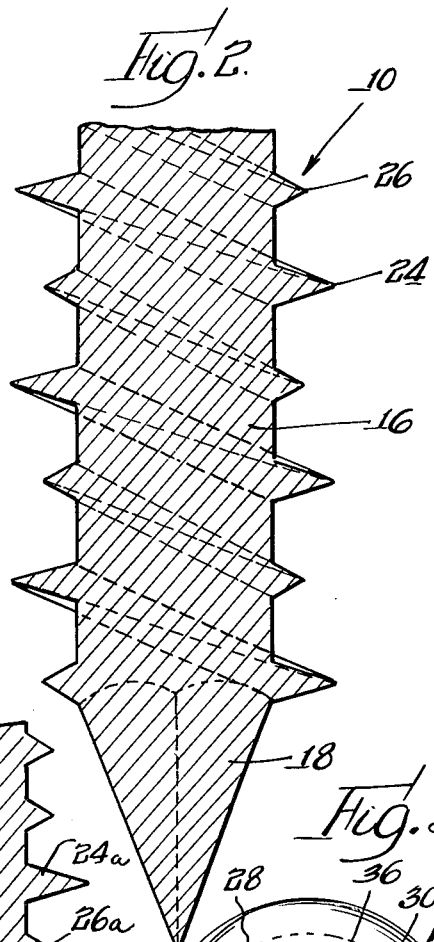
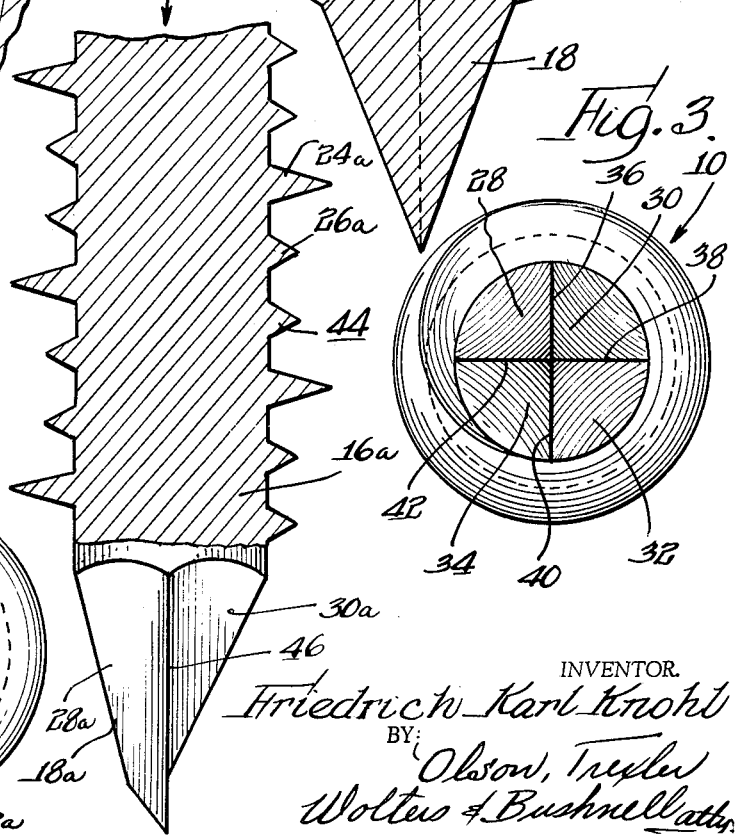
INVENTOR.
Friedrich Karl Knohl
BY Olson, Trexler
Wolters & Bushnell attys.

United States Patent Office 3,207,023
Patented Sept. 21, 1965

3,207,023
SCREW FASTENER
Friedrich Karl Knohl, Roselle, Ill., assignor to Illinois Tool Works Inc., Chicago, Ill., a corporation of Delaware
Continuation of application Ser. No. 156,377, Dec. 1, 1961. This application Sept. 4, 1964, Ser. No. 401,750
4 Claims. (Cl. 85—46)

This application is a continuation of my copending application, Serial No. 156,377 filed December 1, 1961, which is now abandoned.

The present invention relates to a novel fastener structure, and more specifically to a novel rotary fastener device such as a screw or the like.

An important object of the present invention is to provide a novel screw member capable of forming complementary thread means in a workpiece during application to the workpiece, which screw member is constructed so as to provide improved holding power and resistance to loosening while reducing any possibility of stripping or shearing of the complementary thread means formed in the workpiece.

A further important object of the present invention is to provide a novel screw member of the above described type and adapted selectively to be used for application to wood or similar materials or for application to sheet metal and the like.

A further object of the present invention is to provide a novel screw member of the above described type which may be relatively easily started and driven into a workpiece without requiring pre-drilling and without damage to the screw member or the workpiece.

Other objects and advantages of the present invention will become apparent from the following description and the accompanying drawing wherein:

FIG. 1 is a partial sectional view showing a screw member incorporating features of the present invention driven into a workpiece;

FIG. 2 is an enlarged fragmentary sectional view showing a portion of the screw member in greater detail;

FIG. 3 is an entering end view of the screw member shown in FIGS. 1 and 2;

FIG. 4 is a fragmentary sectional view similar to FIG. 2 but showing a modified form of the present invention; and FIG. 5 is an entering end view of the screw member shown in FIG. 4.

Referring now more specifically to the drawings wherein like parts are designated by the same numerals throughout the various figures, a screw member 10 incorporating one embodiment of the present invention is shown in FIGS. 1, 2 and 3. While it will be apparent that the screw member may be used for various purposes, FIG. 1 shows an installation wherein the screw member 10 is used to secure a plate 12 to a wooden support member 14.

The screw member 10 comprises an elongated shank 16 of substantially uniform diameter throughout its length. A tapered or substantially pointed section 18 is provided at the entering end of the shank, and an enlarged head section 20 is integrally joined with the trailing end of the shank. A slot 22 or other suitable tool engageable means is provided in the head section 20.

In accordance with a feature of the present invention, the screw member is provided with a first helical thread 24 integral with the shank 16 and having a plurality of convolutions extending along the shank. A second helical thread 26 is provided on the shank and includes a plurality of convolutions spaced along the shank between the convolutions of the thread 24. The threads 24 and 26 have substantially the same pitch. However, it is to be noted that the thread 24 has a relatively great heighth and a small included angle as compared with the thread 26. In the embodiment shown the height of the thread 24 is approximately twice that of the thread 26. The included angle of the thread 24 is preferably approximately thirty degrees while the included angle of the thread 26 is about forty-five degrees.

When the screw member 10 is applied to a workpiece such as the wooden support 14, the threads 24 and 26 will form complementary thread means in the workpiece. The relatively high thread 24 will project or bite into the workpiece relatively deeply for increasing the area of engagement between the thread and the workpiece. The aforementioned relatively small included angle of the thread 24 which provides the thread with a narrow profile as shown best in FIG. 2, facilitates easy entry of the thread into the workpiece without injury to the screw member and without splitting or otherwise damaging the workpiece. The relatively short thread 26 also projects into the workpiece and adds to the area of thread engagement with the workpiece and therefore increases the holding power and resistance to loosening of the screw member. However, it is to be noted that since the crests of the convolutions of the thread 24 project well beyond the thread 26, the length of the effective shear line provided by the screw member 10 is determined by the thread 24 and coincides with the pitch of the thread 24. The length of this effective shear line or pitch of the thread 24 is about twice the distance between adjacent convolutions of the threads 24 and 26. Thus, while the thread convolutions 26 provides the device with increased holding power and resistance to loosening, it does not reduce the length of the effective shear line so that when the screw member is applied to the work structure as shown in FIG. 1, and possibility of stripping or shearing the complementary thread means formed in the workpiece 14 is minimized.

Since the included angle of the thread 26 is larger than the included angle of the thread 24, the root of the thread 26 is similar in thickness to that of the thread 24. In other words, the roots of all of the thread convolutions are similar in thickness and are substantially equally spaced along the shank. This arrangement enables the screw member to be applied to a sheet metal work structure, not shown, as well as to a wooden work structure. In other words, the screw member 10 may be selectively used as a wood screw or as a sheet metal fastener.

The entering end section 18 of the screw member 10 is preferably formed so as to be capable of drilling an aperture in a work structure during application of the screw member to the work structure. In this embodiment, the section 18 is substantially pointed and is formed with a plurality of substantially identical sides 28, 30, 32 and 34 which intersect each other along converging and intersecting corners or lines 36, 38, 40 and 42. The corners 36–42 provide cutting edges for enabling the entering end section 18 of the screw member to drill or ream an aperture in a work structure. Preferably, the side surfaces 28–34 of the pointed end section are provided with a concave configuration as shown best in FIG. 3, so as to relieve the entering end section 18 behind the cutting edges and thereby promote a more efficient cutting action.

FIGS. 4 and 5 show a device which is similar to the structure described above as indicated by the application of identical reference numerals with the suffix a to corresponding elements. This embodiment differs in that a third thread 44 is provided on the shank 16a which thread has a plurality of helical convolutions spaced along the shank between the convolutions of the threads 24a and 26a. The thread 44 is identical to the thread 26a. The thread convolutions of this embodiment are, like the structure described above, substantially uniformly spaced along the shank 16a so that the structure may be selectively applied to wood and similar materials or sheets of metal and the like. The additional thread provides for increased engagement with the work structure and greater holding power.

The screw member 10a also includes a modified entering end section or drill point 18a. In this embodiment two of the side portions 30a and 32a are relieved substantial amounts so as to provide faces 46 and 48 substantially in a plane containing the longitudinal axis of the screw member and intersecting the side surfaces 28a and 34a at acute angles for promoting a more effective cutting action at the corners or edges 36a and 40a.

While the preferred embodiments of the present invention have been shown and described herein, it is obvious that many structural details may be changed without departing from the spirit and scope of the appended claims.

The invention is claimed as follows:

1. A screw member for drilling into a non-metallic workpiece comprising an axially extending shank including an elongated portion having a substantially uniform predetermined diameter throughout its length; a first long lead helical thread having a plurality of convolutions on said shank and a relatively large predetermined height and being of substantially uniform size and shape throughout, a second long lead helical thread having a plurality of convolutions and a height substantially less than said predetermined height and substantially greater than said predetermined diameter and being of substantially uniform size and shape throughout, both of said threads having crests presenting sharp edges for facilitating penetration of a workpiece, said first thread having a relatively small included angle and said second thread having an included angle substantially larger than said first thread, all of said threads having roots of substantially the same axial extent, and said shank including a substantially pointed work drilling tip, all of said threads having a substantially uniform root diameter throughout and subsequently terminating short of said tip, said tip comprising a cutting edge extending substantially to said diameter of said elongated shank portion for drilling a hole in a workpiece having a diameter substantially the same as said shank portion, said tip being recessed adjacent said cutting edge for promoting faster cutting action and providing a cavity for accommodating material cut from the workpiece, said cutting edge and recess extending substantially to and terminating at said threads for drilling a hole having a diameter equal to said root diameter prior to engagement of the threads with the workpieces.

2. A screw member, as defined in claim 1, which includes a third helical thread having a plurality of convolutions on said shank between the convolutions of said first and second threads, said third thread having a height substantially less than said predetermined height.

3. A screw member, as defined in claim 1 wherein said first thread has an included angle of about thirty degrees and said second thread has an included angle of about forty-five degrees.

4. A screw member, as defined in claim 1, wherein said roots are spaced from each other substantially equal distances at least as great as the axial extent of said roots.

References Cited by the Examiner

UNITED STATES PATENTS

| | | | |
|---|---|---|---|
| 410,698 | 9/89 | Rogers | 85—48 |
| 2,956,470 | 10/60 | Knohl | 85—47 |

FOREIGN PATENTS

| | | |
|---|---|---|
| 251,409 | 5/26 | Great Britain. |
| 50,995 | 1/10 | Switzerland. |

CARL W. TOMLIN, *Primary Examiner.*

EDWARD C. ALLEN, *Examiner.*